Dec. 22, 1942.  G. HAGEDORN  2,305,774
ELECTRIC RESISTANCE SPOT WELDING TONGS
Filed April 3, 1941  2 Sheets-Sheet 1

Inventor,
Gerhard Hagedorn
by: Hascock Downing & Seebold
Attorneys.

Dec. 22, 1942.   G. HAGEDORN   2,305,774
ELECTRIC RESISTANCE SPOT WELDING TONGS
Filed April 3, 1941   2 Sheets-Sheet 2
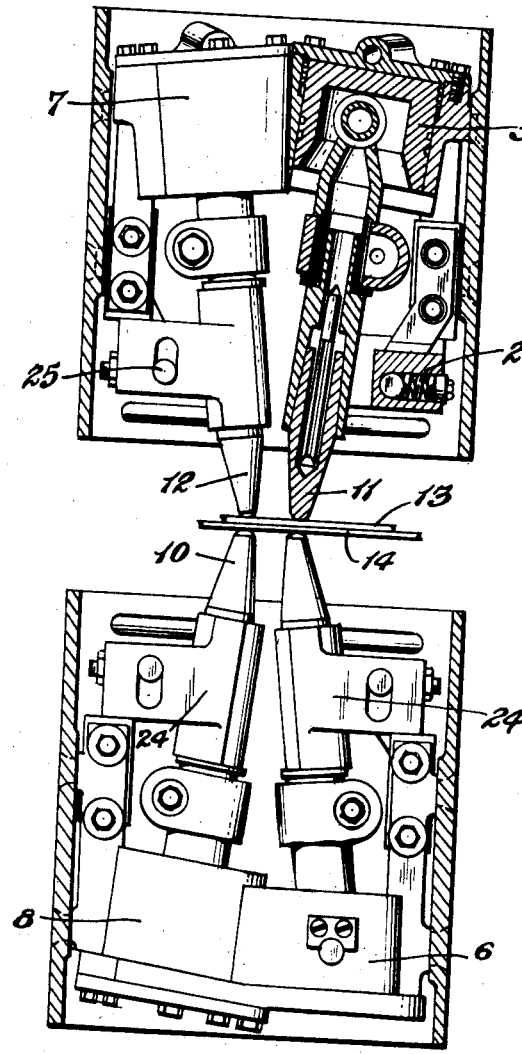
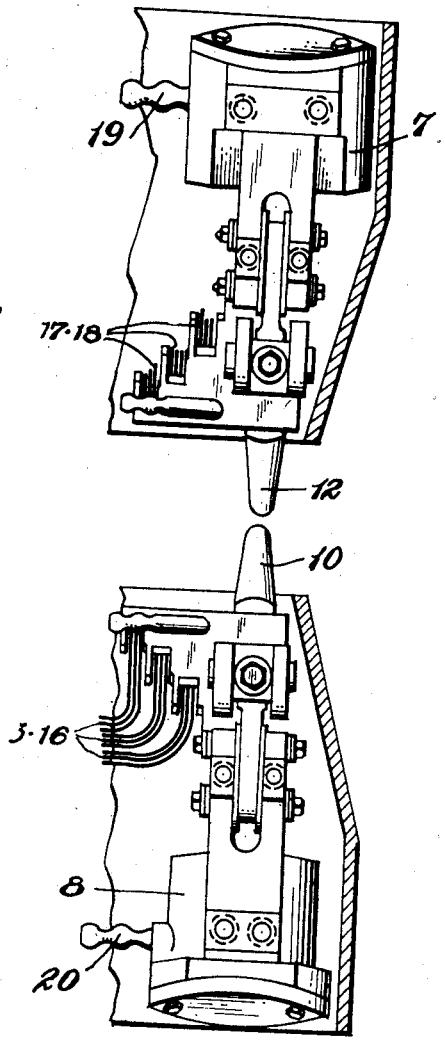
Inventor,
Gerhard Hagedorn
By Glascock Downing & Seebold Attorneys Patented Dec. 22, 1942

2,305,774

UNITED STATES PATENT OFFICE 2,305,774

ELECTRIC RESISTANCE SPOT WELDING TONGS

Gerhard Hagedorn, Berlin-Lichterfelde, Germany; vested in the Alien Property Custodian Application April 3, 1941, Serial No. 386,701
In Germany March 6, 1940

4 Claims. (Cl. 219—4)

The present invention relates to an electric resistance spot welding tongs distinguished by two welding electrodes each, inclined inwardly and flexible outwardly, provided in each arm of the tongs, one of which is firmly held in the lower arm and the others are preferably forced forward by compressed air, and the upper arm being provided with a swiveling head that can be secured, a double spot welding transformer being arranged in each arm and directly connected to the electrodes. Suitably two medium or high frequency double spot welding transformers, preferably adapted for use with frequencies ranging from 300 to 20,000 cycles per second, may be provided. The body of the tongs is carried by a ball-and-socket joint and has a box-shaped cross section through which cooling air is fed into both double spot welding transformers and electrodes by means of a single fan. It is of particular importance that the welder provided by the invention is primarily intended for welding light metals. The outstanding advantages of this welder over the stationary single spot welders heretofore used for welding light metals are its materially lighter weight, the throat that may be of any desired depth, and its great mobility. The supernormal frequency adds greatly to reducing the measurements and weight.

The invention will be better understood by reference to the accompanying drawings, in which:

Fig. 4 is a view of the electrode heads, partially in section, and

Fig. 5 is a side elevation of the electrode heads shown in Fig. 4.

Figure 1:
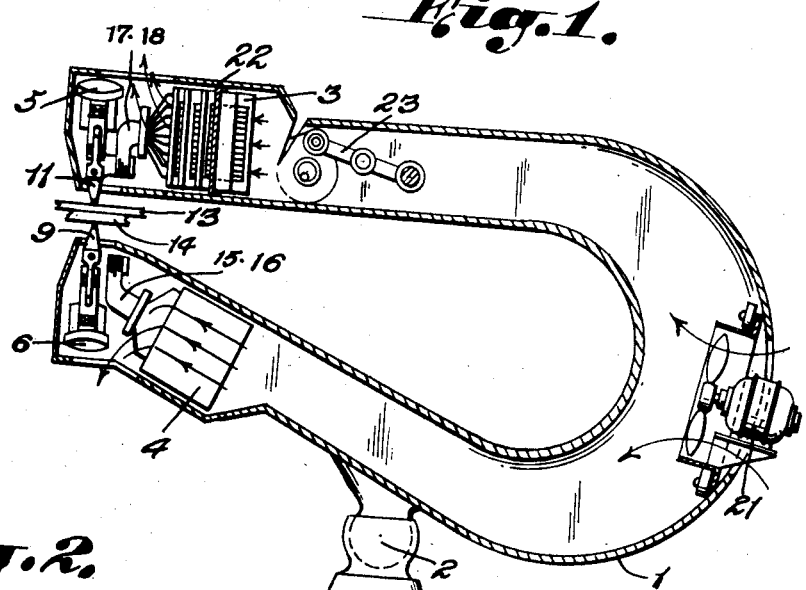
Fig. 1 is a side elevation showing the welder partially in section.
Figure 2:
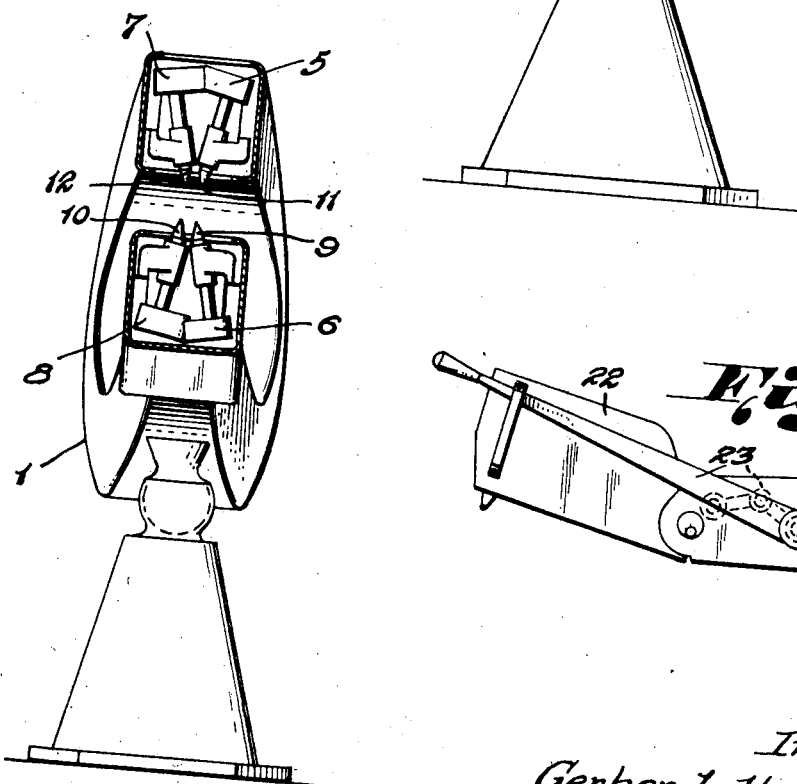
Fig. 2 is a front view of the welder.
Figure 3:
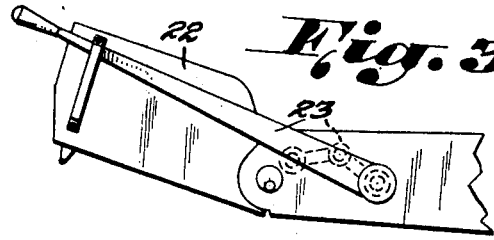
Fig. 3 is a view of the upper welding head.

In the drawings the bow 1 of the welder having a box-shaped cross section is held by a ball-and-socket joint 2. In the extremities of the bow are accommodated the double spot welding transformers 3 and 4, preferably adapted for use with medium frequency, and also the welding electrodes 11 and 12 preferably controlled by means of compressed air cylinders 5 and 7, said electrodes and the holders thereof respectively being sloped inwardly so as to assume an inclined position on the stock 13, 14 to be welded. Of the lower electrodes 9 and 10, the electrode denoted at 10 is also operated by compressed air (member 8), while the electrode 9—though swiveling like the other electrodes—is not provided with a pneumatic drive. The bearing point or support for the electrode 9 is denoted at 6. The members 15, 16, 17, and 18 represent conductors for the current leading from the transformers to the electrodes. The nipples 19 and 20 shown in Fig. 5 serve for the supply of compressed air. The fan 21 shown in Fig. 1 feeds cooling air through the hollow arms direct to the double spot welding transformers and electrodes. The member 22 shown in Figs. 1 and 3 is the swiveling head which is moved and locked by the lever rods 23.

The electrode holders 24 and electrodes respectively are in an inclined position inwardly and guided by the pins 25. Each stop pin 25 is prevented from moving inwardly, but is capable of moving outwardly in counteracting the pressure of the spring 26. Thus the electrode holder is capable of moving outwardly only. This arrangement has for its object that the electrodes will not be lifted from the stock to be welded by the electrodynamic forces of the welding current, but will be pressed against the stock to be welded more intensely. Thereby the rapid melting of the electrodes will be safely prevented.

The fixed electrode 9 is used as a support for the material to be welded, so the latter is stationary and only the three other electrodes move. The invention provides that the stroke of electrodes is only a few millimeters with a view to save time and prevent the electrodes from hammering against the material to be welded. The hammering of the electrodes results in impressions with sensitive metals. According to the invention the small stroke of the electrodes is made possible by the swiveling capacity of the upper head of the tongs. In this manner every workpiece may be readily inserted between the electrodes in spite of the small stroke of the electrodes. The transformers are air cooled. Thereby the formation of sweat at the transformer being sensitive to moisture will be avoided. The body of the tongs is used as conduits for the air with the result that both transformers may be cooled by one fan.

I claim:

1. Electrical welding apparatus comprising, a hollow body member having a first and a second arm, a hollow head member pivotally mounted on the first arm in open communication therewith, an electrode mounted on said head member directed towards the second arm, an electrode mounted on the second arm extending towards the first electrode, means for supplying current to said electrodes, means for swinging the head member with respect to the first arm, and means for forcing a cooling medium through said arms.

2. Electric spot welding apparatus comprising, a U-shaped hollow body member having a first and a second arm, a hollow head member pivotally mounted on the first arm in open communication therewith, an electrode mounted on said head member extending towards the second arm, an electrode mounted on the second arm projecting towards the first electrode, means for supplying current to said electrodes, means for swinging the head member with respect to the first arm, and a fan mounted in an opening in said hollow member for forcing air through said arms and through said head member over said electrodes.

3. Electric spot welding apparatus comprising, a U-shaped hollow body member having a first and a second arm, a hollow head member pivotally mounted on the first arm in open communication therewith, electrodes mounted on said head member extending towards the second arm, electrodes mounted on the second arm extending towards the first electrodes, a transformer mounted within the second arm adjacent the electrodes thereon for supplying current to the electrodes on the second arm, a transformer mounted within said head member for supplying current to the electrodes mounted on the head member, a fan mounted in an opening in said hollow body member for forcing a cooling medium through said arms and said head member to cool said transformers.

4. Electric spot welding apparatus comprising, a hollow body member having a first arm and a second arm, a hollow head member pivotally mounted on the first arm, two electrodes mounted within said head member extending towards said second arm and being inclined towards each other at the outer ends thereof, two electrodes mounted within the second arm and extending towards the head member and inclined towards each other at the outer ends thereof, a transformer mounted within the second arm, conductors connecting the transformers to the electrodes mounted within said second arm, a transformer mounted within said head member, conductors connecting the second transformer to the electrodes within the head member, and means for swinging the head member with respect to the first arm.

GERHARD HAGEDORN.